(12) United States Patent
Yang et al.

(10) Patent No.: US 6,286,477 B1
(45) Date of Patent: Sep. 11, 2001

(54) COMBUSTION CHAMBER FOR DIRECT-INJECTED SPARK-IGNITED ENGINES WITH SWIRL AIRFLOWS

(75) Inventors: Jialin Yang; Jianwen Yi, both of Canton; Zhiyu Han, Plymouth, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/469,050

(22) Filed: Dec. 21, 1999

(51) Int. Cl.[7] .................................................. F02F 3/26
(52) U.S. Cl. ......................... 123/276; 123/263; 123/305
(58) Field of Search ..................................... 123/305, 306, 123/307, 276, 279, 260, 302, 261, 263, 661, 295

(56) References Cited

U.S. PATENT DOCUMENTS

| | | | |
|---|---|---|---|
| 4,920,937 | 5/1990 | Sasaki | 123/305 |
| 4,958,604 | 9/1990 | Hashimoto | 123/276 |
| 5,109,816 * | 5/1992 | Sasaki | 123/263 |
| 5,127,379 * | 7/1992 | Kobayashi et al. | 123/302 |
| 5,245,975 | 9/1993 | Ito | 123/520 |
| 5,259,348 | 11/1993 | Kobayashi | 123/260 |
| 5,327,864 * | 7/1994 | Regueiro | 123/260 |
| 5,479,889 | 1/1996 | Sato | 123/308 |
| 5,553,588 | 9/1996 | Gono | 123/276 |
| 5,676,107 | 10/1997 | Yuzuriha | 123/302 |
| 5,735,240 * | 4/1998 | Ito et al. | 123/295 |

FOREIGN PATENT DOCUMENTS 0 778 402 A1   11/1997   (EP) .

* cited by examiner

*Primary Examiner*—Henry C. Yuen
*Assistant Examiner*—Mahmoud Gimie
(74) *Attorney, Agent, or Firm*—Jerome R. Drouillard

(57) ABSTRACT

A stratified-charge combustion chamber system for a direct-injection spark-ignited (DISI) engine with a swirl-type airflow. An asymmetrical combustion bowl design in the top wall of the piston provides a wide area on the downstream side of the swirl flow and a harbor area upstream of the swirl flow in a direction further away from the fuel injector. The edge of the combustion bowl is comprised of smoothly-connected curves with large radii, except for the curve connecting the wide and harbor areas, which has a small radius. The vertical cross-sections of the bowl also have large radii in order to guide the air-fuel mixture and rebounded fuel droplets toward the spark plug and prevent dead regions for the fuel. The precise position of the spark plug in the harbor area can be adjusted as desired within a certain range to improve ignitability of the air-fuel mixture.

12 Claims, 2 Drawing Sheets

COMBUSTION CHAMBER FOR DIRECT-INJECTED SPARK-IGNITED ENGINES WITH SWIRL AIRFLOWS

CROSS-REFERENCE TO RELATED APPLICATIONS

The present application is related to U.S. Ser. No. 09/174,237, filed Oct. 16, 1998, and entitled "Cylinder Head Intake System", and also related to U.S. Ser. No. 09/479,816, entitled "Three-Valve Cylinder Head System" and filed concurrently herewith, the disclosures of both of which are hereby incorporated by reference herein.

TECHNICAL BACKGROUND

The present invention relates to stratified-charge direct-injection spark-induced (DISI) internal combustion engines with swirl airflows and combustion bowls in the pistons.

BACKGROUND

Forming a stratified charge air-fuel mixture through direct-injection of gasoline fuel into the cylinder of an internal combustion engine can improve fuel economy at low-load operation and reduce undesirable emissions. The quality of charge stratification depends on the design of the combustion chamber geometry, in-cylinder airflow, and the location and spray characteristics of the fuel injector. With some current fuel injection systems, a combustion chamber bowl is formed in the top wall of the piston and the fuel injector is located adjacent the side of the cylinder bore in order to reduce the injector temperature.

Internal combustion engines of this type are often called direct-injection spark-induced (DISI) engines and there are many different designs and systems known today. For example, a DISI engine with a tumble-flow of inlet air is shown in U.S. Pat. No. 5,711,269. DISI engines with a swirl-type airflows as shown, for example, in U.S. Pat. Nos. 5,259,348 and 5,553,588.

There is a need with DISI engines to improve the stratification of the fuel-air charge mixture and decrease the velocity of the air-fuel mixture at the spark plug in order to improve the ignitability of the mixture and reduce unwanted emissions. It is an object of the present invention to provide an improved DISI engine in this regard.

SUMMARY OF THE INVENTION

The present invention provides a unique combustion chamber configuration for use with an engine having a swirl-type airflow. The combustion bowl :Ln the top wall of the piston has an asymmetrical configuration. On the downstream side of the swirl airflow, the bowl is wider in order to better retain fuel droplets. On the upstream side of the swirl flow, the bowl is extended farther away from the fuel injector to form a "harbor" generally at the center of the piston where the spark plug is located. With this configuration, rich air-fuel mixtures separate from the walls of the piston and join with the air for further mixing. The air flow of both the swirl and the squish flows are reduced in and adjacent to the harbor area, thus lowering the velocity of the air-fuel mixture at the spark plug.

The axis of the fuel spray preferably is at an angle of about 30–60° from the horizontal and at an angle of about 0–15° downstream from a vertical plane including the injector and the center of the cylinder bore. The top surface of the piston is also formed to generate a strong squish near the end of the compression stroke.

Further details, objects and benefits of the present invention will become apparent from the following description of the invention when viewed in accordance with the attached drawings and appended claims.

BEST MODE(S) OF THE INVENTION

The present invention provides a unique combustion chamber design and configuration for a direct-injection spark-ignited (DISI) internal combustion engine. The invention can be utilized in either a three-valve or four-valve engine. The present invention provides an improved stratified charge mixture of injected fuel and air in order to increase fuel economy and reduce undesirable emissions.

Figure 1:
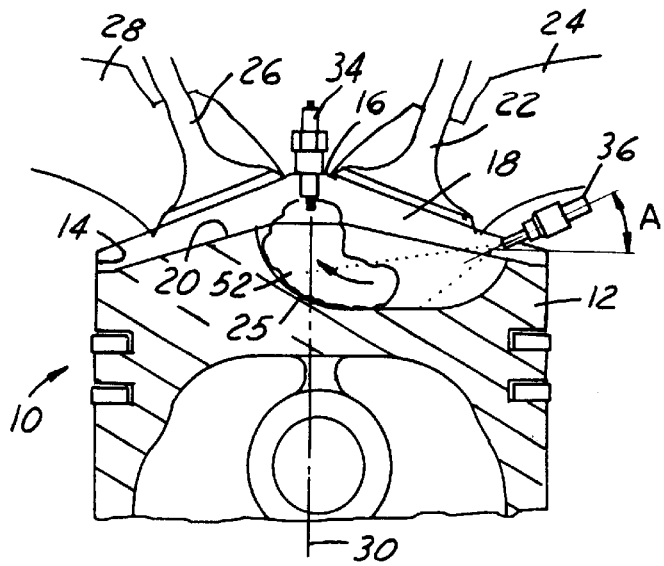
FIG. 1 is a cross-sectional view of a cylinder head, piston and combustion chamber configuration in accordance with the present invention.

The present invention is referred to generally by the reference numeral 10 in FIG. 1. As shown in FIG. 1, the present invention is utilized with an internal combustion engine having a piston 12, a cylinder bore 14, and a cylinder head 16. A combustion chamber 18 is formed between the top wall 20 of the piston 12 and the lower wall of the cylinder head 16. Only a portion of the engine and one cylinder and one cylinder bore and piston are shown for illustrative purposes.

Figure 2:
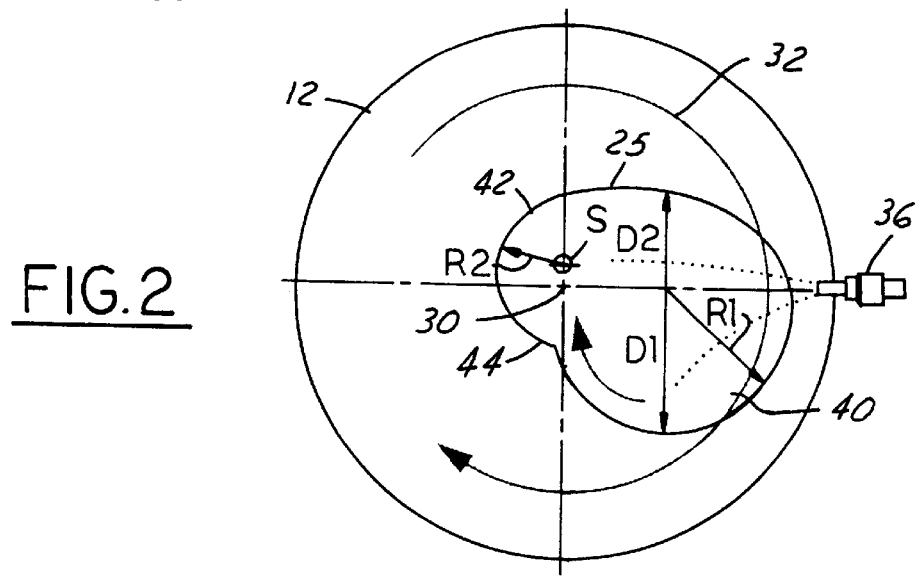
FIG. 2 illustrates a preferred piston combustion bowl configuration, together with a first embodiment of a fuel injector orientation.

One or more intake valves 22 are positioned in the cylinder head, together with associated air intake ports/conduits 24. In addition, one or more exhaust valves 26 are also positioned in the lower wall of the cylinder head, together with accompanying exhaust ports/conduits 28. In accordance with the present invention, at least one of the inlet ports 24 is a swirl-type inlet port which causes the inlet air to form a swirl-type pattern of airflow in the combustion chamber 18. With a swirl-type airflow, the air flows in a circular manner generally transverse or perpendicular to the central axis 30 of the cylinder bore 14. The swirl-type airflow is circulated in a clockwise direction 32 when viewed from the top, as shown in FIG. 2.

Figure 3:
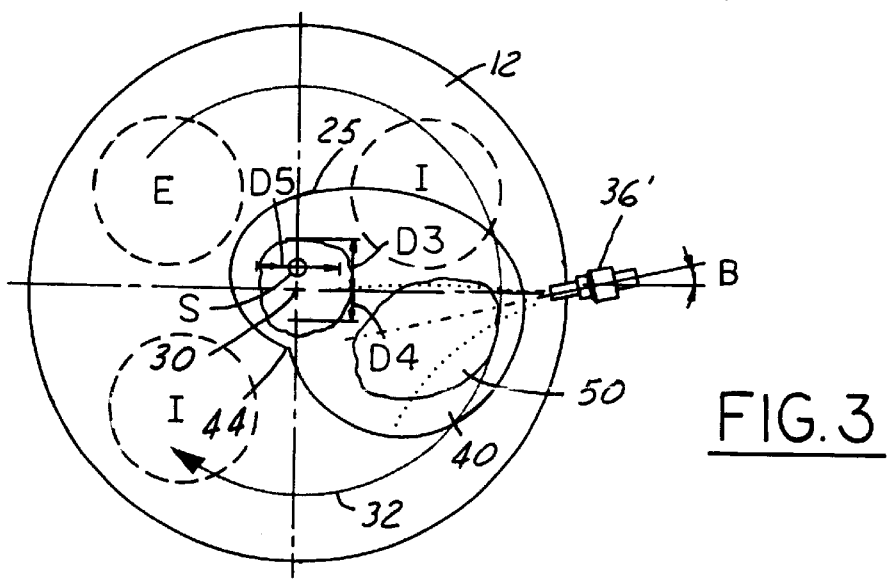
FIG. 3 illustrates a second embodiment of the invention utilizing the preferred piston bowl configuration and a second orientation of the fuel injector.

Any conventional type of swirl-forming conduit port and valve mechanisms, such as port throttles, can be used to create the swirl-type of inlet airflow in the cylinder. In the alternative, one preferred system for creating a swirl-type airflow without the use of swirl forming mechanisms is shown in co-pending U.S. patent application, Ser. No. 09/174,237, filed on Oct. 16, 1998, and entitled "Cylinder Head Intake System", the disclosure of which is hereby incorporated by reference herein. In accordance with that disclosure, a helicoid inlet port is utilized in combination with a tangent inlet port and a single exhaust port, particularly for use with a three-valve engine. With a three-valve engine, the two inlet ports and one exhaust port are located substantially in three of the four quadrants of the cylinder bore, as shown in FIG. 3. The fuel injector is positioned to spray fuel into the fourth quadrant.

The spark plug 34 is positioned generally in the center of the cylinder adjacent to, or coextensive with, the central longitudinal axis 30. The fuel injector, which can be of any conventional design, is positioned in the lower wall 16 of the cylinder head adjacent to the wall of the cylinder 14, which is a cooler portion of the cylinder bore. This is shown in FIG. 1. Also, the axis of the fuel injector 36 and the fuel spray has an angle A of about 30–60° from the horizontal, and preferably about 40–55°.

The inclination of the fuel injector 36 relative to a vertical plane through the injector and the central axis 30 of the cylinder can also be adjusted within a limited range. The fuel injector can have an orientation directly along the imaginary plane from its location to the central axis 30, as shown in FIG. 2. In the alternative, the fuel injector, as represented by reference number 36' in FIG. 3, can have an angle B from 0–15° from the imaginary vertical plane. In this regard, the angle of the injector is established in order to spray fuel in the downstream direction relative to the swirl-type airflow 32. One preferred angle of orientation is 10°.

In accordance with the present invention, the combustion bowl has an asymmetrical configuration, as shown in the drawings. On the downstream side of the swirl flow 32, the bowl has a wider or enlarged portion 40. In this regard, as shown in FIG. 2, the distance D1 from the imaginary vertical plane between the injector 36 and the central axis 30 is larger than the distance D2 in the upstream direction of the bowl configuration and airflow. The distance D2 is typically in the range from one-seventh to one-fifth of the bore diameter. The ratio of distance D1 to D2 is preferably in the range of 1.5–2.0 to 1.

In addition to the wider downstream bowl area 40, the combustion bowl 25 has an area or portion which is extended further away from the fuel injector past the spark plug 34 and toward the upstream side of the swirl airflow. This forms a "harbor" area 42. The spark plug S (or 34) is positioned in the harbor area 42, with the precise positioning being described in more detail below.

The edges of the combustion bowl 25 (when viewed from a top elevation) are composed of smoothly-connected curves with large radii, except for the curve 44 which connects portions 40 and 42 of the bowl, such curve 44 having a small radius. On this regard, preferably the larger downstream portion 40 of the combustion bowl has an arcuate shape formed by a radius R1, while the harbor area 42 of the combustion bowl has a shape or configuration formed by a radius R2. R1 is greater than R2 and the ratio R1 to R2 is about 2 to 1.

In vertical cross-section as shown in FIG. 1, the bowl 25 preferably has large radii curves from the flat bottom section which merges with the curved side portions. This promotes ease of movement of the air and fuel in the bowl and the resulting air-fuel mixture as the flow proceeds up the sides of the bowl. The large radii of the vertical cross-sections of the combustion bowl assist in guiding any rebounded fuel droplets to the desirable direction of the spark plug. There are no "dead" corners where fuel might be trapped resulting in soot, and undesirable carbon dioxide and hydrocarbon emissions.

The top wall 20 of the piston 12 is formed to generate a strong squish near the end of the compression stroke of the piston. In this regard, the top wall 20 of the piston preferably has a configuration substantially similar to the configuration of the lower wall of the cylinder head 16.

The larger portion 40 of the combustion bowl downstream of the fuel injector 36, 36' captures fuel droplets which are blown downstream by the swirl flow 32 when the fuel is injected later in the compression stroke. In this manner, the injected fuel has a tendency to stay in the downstream side of the bowl surface relative to the fuel injector. When the inlet air is squished into the bowl near the end of the compression stroke, the swirl motion is intensified because the size of the bowl is smaller than the size of the cylinder bore and the air tends to conserve angular momentum. The air swirl in the bowl moves the rich mixture of fuel and air to the center of the bore along the wall of the bowl and toward the area where the spark plug is located.

The rich mixture adjacent to the bowl surface is moved by the swirl flow in the bowl to the harbor area 42. Since the bowl area and shape are extended in the harbor area, separation of the rich mixture and the piston wall occurs and the rich mixture expands and mixes with additional air for further mixing. Also, any film of fuel on the surface of the bowl break-ups when it enters the larger harbor area.

Due to the increase in the flow cross-sectional area in the harbor, the motions of both the swirl and squish flows are reduced in velocity. This reduces the air velocity at the spark plug gap and improves the ignitability and flame stability of the mixture.

Figure 4:
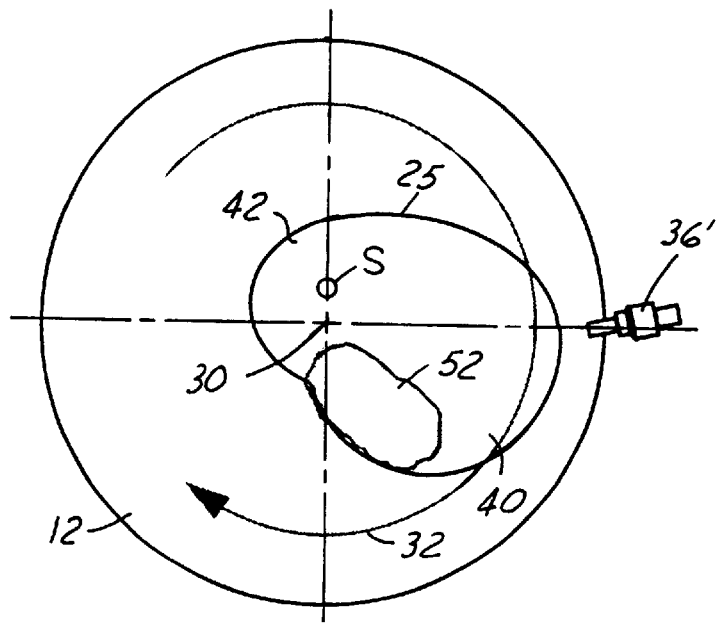
FIGS. 4 and 5 illustrate use of the present invention in a combustion cycle of an engine.
Figure 5:
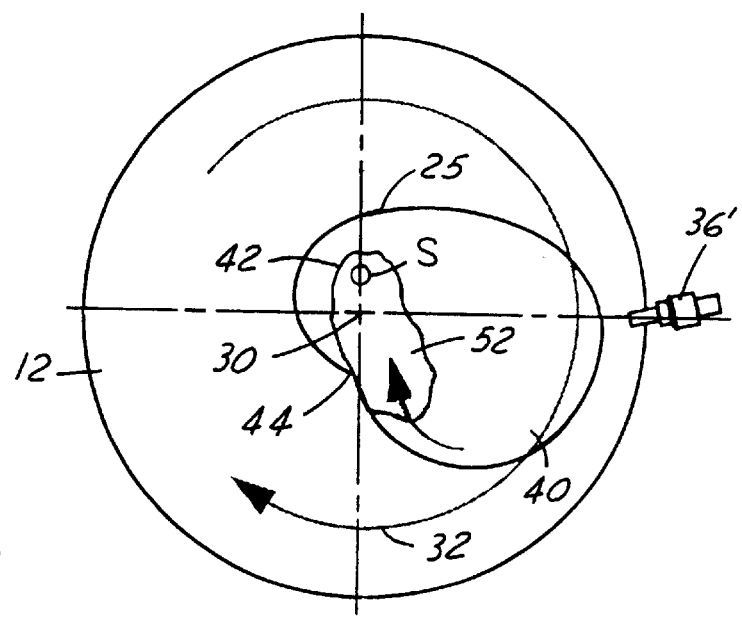

The operation of the engine in accordance to the present invention is shown generally in FIGS. 3–5. In FIG. 3, the fuel is injected forming a fuel cloud of spray droplets 50. As fuel is injected into the combustion bowl 25, the spray droplets are forced downstream by the airflow swirl 32 in the cylinder. The fuel spray droplets are immediately mixed with the airflow 32 from the inlet ports creating an air-fuel cloud or mixture.

The air-fuel mixture 52, then proceeds along the wall of the combustion chamber bowl 25, as shown in FIG. 4. The shape of the combustion bowl adjacent corner 44 directs the air-fuel mixture 52 toward the spark plug S. The air-fuel mixture peels off the sharp curve 44 and recirculates in the harbor area 42. The larger area of the harbor 42 allows the mixture to reorganize and expand which decreases its velocity and improves the ability of the mixture to ignite and burn. By reducing the velocity of the air-fuel mixture, the invention provides better mixing of the air and fuel in the cloud and captures the air-fuel mixture in the harbor in the area adjacent the spark plug.

The swirl in the combustion bowl increases in strength as the piston moves up further in the compression stroke. As a result, the swirl in the bowl 25 moves the fuel mixture or zone to the harbor area 42 where the spark plug is located. As the mixture expands, it further mixes with air and slows down or decreases in velocity at that point.

At the same time, the air-fuel mixture 52 moves up vertically along the walls of the harbor 42 toward the spark plug. This is shown in FIG. 1 where the air-fuel mixture 52 is shown in dashed lines encompassing the end of the spark plug 34. The large radii of the sides of the bowl 25 guide the rebounded fuel droplets into the air-fuel mixture and toward the spark plug. This voids a dead region for the fuel where the mixture might become too rich creating unwanted soot and undesirable emissions.

The position of the spark plug 34 in the combustion bowl 25 and more particularly in the harbor area 42, can be situated or adjusted as desired in order to provide optimum ignitability and burn of the air-fuel mixture 52. As shown in FIG. 3, the spark plug S is positioned adjacent to and not precisely on the longitudinal axis 30 of the cylinder. In particular, in accordance with the present invention, the position of the spark plug S can be situated or adjusted in the direction of area D3 upstream of the imaginary plane between the injector and central axis, in the direction of area D4 downstream of the imaginary plane between the fuel injector and central axis, and also in the direction of area D5 either toward or away from the fuel injector. The distance D3 is in the order of 3–5 millimeters, the distance D4 is in the order of 1–2 millimeters, and the area D5 is in the order of 6–8 millimeters.

By adjusting the position of the spark plug 34 or S in the direction D5 away from the fuel injector 36, 36' and further into the harbor area 42, the spark plug can be in a more optimum position to ignite the air-fuel mixture 52 as it proceeds up the wall of the harbor toward the spark plug.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An in-cylinder injection internal combustion engine having a cylinder with a central axis, a cylinder head, a piston positioned in the cylinder, and a combustion chamber formed by a cylinder head lower wall and a top wall of the piston, said engine comprising:

at least one air inlet port for forming a swirl-type air flow in the combustion chamber;

a spark plug positioned in the lower wall of the cylinder head;

a fuel injector for directing injecting fuel into the combustion chamber; and a combustion bowl positioned in the top wall of the piston, said combustion bowl having an asymmetrical configuration with a first larger area downstream of the swirl airflow past the fuel injector and a second smaller harbor area upstream of the swirl airflow and adjacent the spark plug, said first larger area and said second smaller harbor area both being substantially circular in shape and intersecting at a substantially sharp corner.

2. The engine as claimed in claim 1 wherein the fuel injection is oriented in the range of 30–60° downstream from an imaginary plane from the fuel injector to the central axis of the cylinder.

3. The engine as claimed in claim 1 wherein the fuel injector is oriented in the range of 0–15 degrees from a plane transverse to the central axis of the cylinder.

4. The engine as claimed in claim 1 wherein the engine is a three-valve engine having two air inlet ports and one exhaust port in the lower wall of the cylinder head.

5. The engine as claimed in claim 1 wherein the engine is a four-valve engine having two air inlet ports and two exhaust ports in the lower wall of the cylinder head.

6. The engine as claimed in claim 1 wherein the combustion bowl in a vertical plane parallel to the cylinder axis has a flat bottom portion, curved side portions, and large radii curved portions without dead areas which might trap fuel.

7. The engine as claimed in claim 1 wherein the spark plug is positioned in line with the central axis of the cylinder.

8. The engine as claimed in claim 1 wherein the spark plug is positioned at a location spaced from the central axis of the cylinder, said location being in the range of 2–8 millimeters from the central axis.

9. The engine as claimed in claim 8 wherein the spark plug is positioned at a location in the harbor area at a distance further from the fuel injector than the central axis of the cylinder.

10. The in-cylinder injection internal combustion engine as set forth in claim 1 wherein a portion of said first wider area has a first radius R1 and a portion of said second harbor area has a second radius R2, and wherein R1 is greater than R2.

11. The in-cylinder injection internal combustion engine as set forth in claim 10 wherein said substantially sharp corner is positioned at the intersection of said portion of said first wider area and said portion of said second harbor area.

12. The in-cylinder injection internal combustion engine as set forth in claim 1 wherein neither said first larger area or said second smaller harbor area have a substantially linear portion.

* * * * *